Sept. 5, 1950

C. WEDEL 2,521,618

QUICK-CHANGE FINGER CONTROL
FOR METER REGULATING MEANS
Filed Sept. 28, 1948

Inventor

Charles Wedel

By Clarence A. O'Brien
and Harvey B. Jacobson
Attorneys

Patented Sept. 5, 1950

2,521,618

UNITED STATES PATENT OFFICE 2,521,618

QUICK-CHANGE FINGER CONTROL FOR METER REGULATING MEANS

Charles Wedel, Minden, Iowa

Application September 28, 1948, Serial No. 51,607

5 Claims. (Cl. 73—233)

1

The present invention relates to certain new and useful improvements in fluid meter controls and regulators of the manually set type, particularly meters which are used on domestic-type tank trucks such as are currently employed by fuel oil dealers in delivering fuel oil from the dealers' headquarters to homes, office buildings and the like.

It is a generally accepted fact that meters such as are available for use in measuring the fluid which is delivered from the truck to a storage tank or other receptacle do not measure exactly the same on products of varying viscosity and fluidity. For instance, when the meter is used for metering (A) kerosene or (B) fuel oil and is calibrated or set to zero on one of the two fuels, if the same meter is used to deliver gasoline it will not accurately meter the latter product. For this reason most meters manufactured are sold with the general understanding that they are to be calibrated and then fixed or set according to the fuel which is to be passed through the meter for measuring purposes.

Since it is necessary to make provisions for adjusting and regulating flow type meters, manually adjusted calibrators are in use whereby to enable the operator or official sealer to secure the requisite accuracy considered essential in metering petroleum products. While many and varied types of calibrators are perhaps known and in use, the one with which I am herein concerned is identified in the trade as the "Smith" sealed calibrator (Patent 2,291,883 of August 4, 1942), the same being built into the meter cover and serving to provide the means for minute final calibration of the fluid measuring meter. Briefly, the "Smith" calibrator embodies an available regulating dial which actuates the metering mechanism in order that the latter may be set to achieve wanted results. The dial is provided with a screw driver kerf and when it is necessary for the user to make an adjustment it is necessary to remove a sealing cap and to thus uncover the dial. After the adjustment is made, the cap is replaced.

One object of the present invention is to provide novel finger-tip control means which is installed, as an attachment, on the existing type calibrator cap and is mechanically connected with the dial so that it is possible to turn the dial by way of the finger-tip controller and without necessitating removal of the dial and casing cap.

Another object of the invention is to make it possible for the owner of the truck, usually a

2 so-called fuel oil dealer, to be able to use the one truck to deliver gasoline on one trip and fuel oil on another trip, the aforementioned fingertip controller then providing a quick change over device which makes it possible for the driver of the truck to quickly set the meter for gasoline if he has gasoline on board or to set the meter for fuel oil if the latter is the product on board.

Other objects and advantages will become more readily apparent from the following description and the accompanying illustrative drawings.

In the drawings, wherein like numerals are employed to designate like parts throughout the views.

Figure 1:
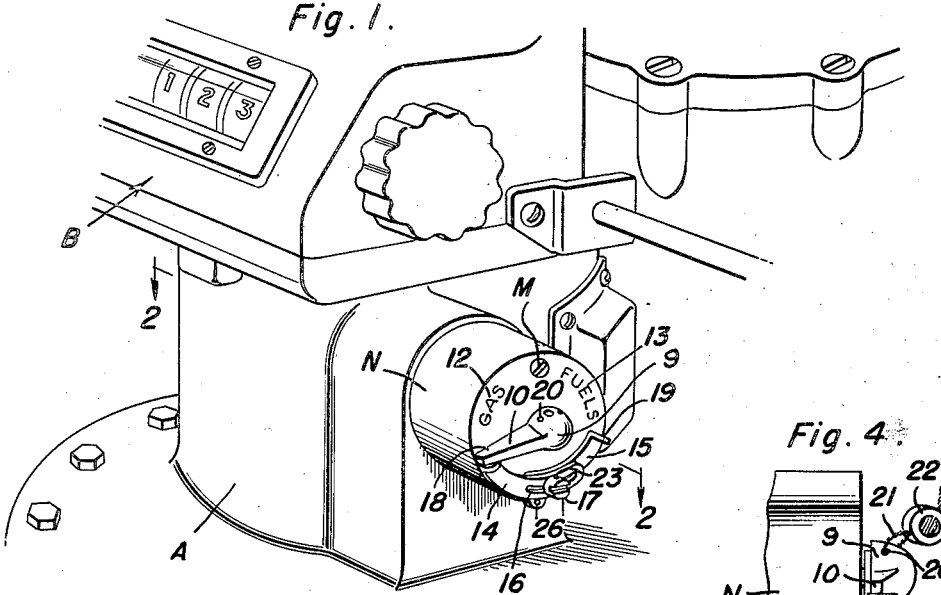
Figure 1 is a fragmentary perspective view showing a fragmentary portion of a petroleum products metering structure illustrating principally the meter cover and the cap enclosed calibrator, the latter being equipped with my improved controller means.
Figure 2:
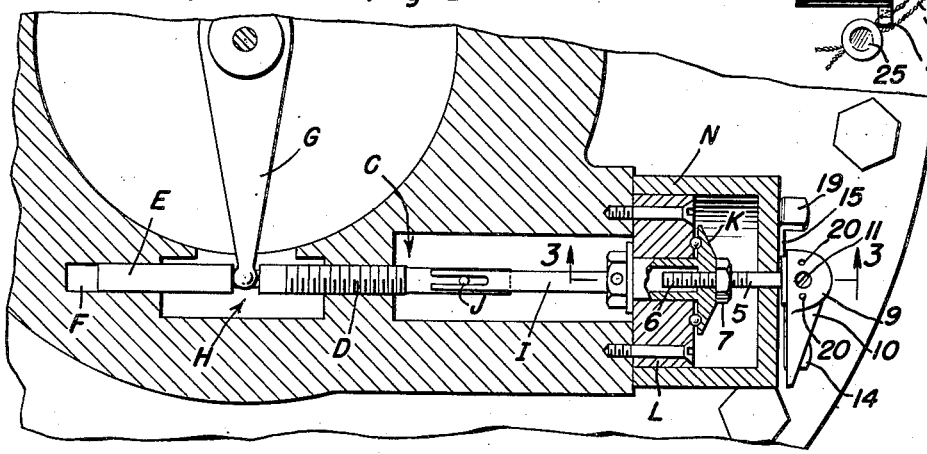
Figure 2 is an enlarged view in section and elevation taken on the plane of the line 2—2 of Figure 1.

Referring now to the drawings by distinguishing reference characters it should be noted that the reference letters denote old structure and that the reference numerals denote the new elements and parts. To this end, and in Figure 1 I show a so-called "Smith" meter cover A with the superposed registering means B. Then, as shown in Figure 2 there is provided a feed screw C threaded in place at D and having one end portion E guided in a socket F provided therefor. The meter regulating adjuster arm is denoted at G and has forked operating connection at H with the feed screw. A rotary adjusting shaft I is slidably keyed as at J to an end portion of the feed screw and said shaft is turned by a dial K whose hub portion is mounted in a bearing block L. Usually the dial is provided with a screw driver kerf (not shown) so that it may be conveniently turned by the official or attendant as the case may be. Fitted over the bearing block and secured in place by a fastening M is a removable protector cap N. It follows that in order to make an adjustment it is necessary to remove the screw M and take off the cap N thus uncovering the screw driver kerf in the dial K.

Figure 3:
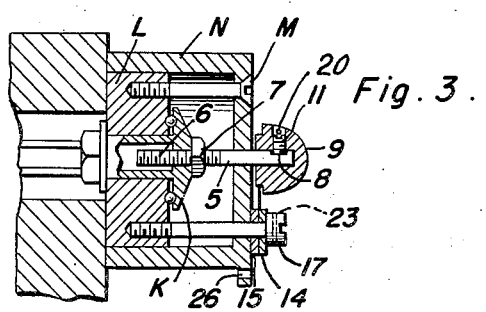
Figure 3 is a fragmentary section on the line 3—3 of Figure 2, looking in the direction of the arrows.

Now, the dial may be turned for simultaneously turning the parts I and C and actuating the regulating crank or arm G. As mentioned, all of these parts are those currently used in the aforementioned "Smith" sealed simplified calibrator. In respect to the latter it may be added that turning the dial in one direction increases the quantity of liquid delivered for any certain counter reading; while turning the dial in the opposite direction decreases the liquid delivered for any given counter reading. After the calibration is finished the cap is replaced and can be sealed to prevent unauthorized persons from tampering with the adjustment made by the authorized operator or official. In the present invention I utilize what may be broadly referred to as attachment means. That is to say, I provide a simple arrangement of parts which collectively provide a novel means applicable to the marketed type "Smith" calibrator, thus adding to the degree of utility of the latter. A stub shaft 5 is provided and is screw threaded at one end as at 6. The central portion of the stock dial K is tapped and screw threads thus provided serve to permit the threads 6 to be screwed into place. This attaches the stub shaft to the dial and then a lock nut 7 is provided and this makes a positive operating connection between the stub shaft and dial. The outer end of the stub shaft is projected through and beyond an opening which is cut in the cap N, the extending end of the shaft being denoted at 8 in Figure 3. The socketed end portion 9 of a finger controller lever 10 is fastened, by a set screw 11 to said extending shaft-end 8. On the exposed surface of the cap I provide designations for "gas" as at 12 and "fuels" as at 13 and the controller lever 10 is registerable with these designations in an obvious manner. Attention is now directed to a pair of coacting selectively usable stops denoted by the numerals 14 and 15. These are arcuate strips of metal or the like and are slotted, as at 16 and held in place by set screw means 17. The slotted ends of the strips overlap and the opposite outer ends are provided with laterally directed terminals 18 and these constitute the actual stops with which the controller lever may be engaged. Thus, swinging the lever to the left and engaging the stop 19 as shown in Figure 1 sets the meter for properly metering gasoline. Swinging the lever over through an approximate half circle and engaging same with the stop 19 sets the meter for delivering a heavier fluid such as fuel oil. It follows therefore that with this simple controller means, which is readily and easily available, the lever may be swung to the left or the right to set and regulate the meter for dispensing gasoline on one hand or fuel on the other, as chosen by the operator of the truck. It follows, therefore, that the so-called "Smith" calibrator equipped with the attachment means herein shown has its utility extended, making it possible to use the one calibrator for accurately metering and dispensing a product of gasoline consistency or fuel oil consistency while, at the same time, providing accurate measuring results.

Figure 4:
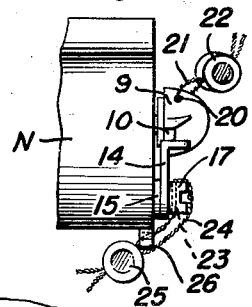
Figure 4 is a fragmentary elevational view showing the manner in which the safety seals, which are preferably used, are applied.

Reference is had again to Figure 4 in conjunction with the other figures which figure is employed, primarily, to show the use of the safety lead wire equipped seals. It is desirable, of course, after the controls are finally regulated and set, to employ seals to avoid tampering with the adjustments by unauthorized persons. Many different ways of utilizing seals in connection with my invention may be employed. However, the arrangement shown in Figure 4 is, it is believed, satisfactory. That is to say, the knob portion of the controller lever 10 is provided with suitable passages or holes 20 to accommodate the wire 21 which is connected with the lead seal 22. This prevents removal of the set screw 11 and consequent removal of the socketed end portion of said lever as will be evident from Figure 3. Secondly, the set screw 17 has a head which is sufficiently thick to permit the provision of a passage or hole 23 therein and this serves to accommodate the wire 24 of the accompanying seal 25. A lug 26 is provided and this also serves to accommodate the wire and seal and makes it possible to conveniently lock the set screw and to avoid tampering with the stops 14 and 15.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

1. In a fluid meter of the class described, meter means, a feed screw mounted for operation on said means, a cap accommodating and bearing block secured on said means, a dial mounted for rotation on said bearing block, an operating connection between the dial and feed screw, a cap fitted removably on said block, fastening means for said cap, said cap having a bearing opening, a stub shaft mounted in said opening, means connecting the stub shaft with said dial for imparting rotation to the dial, a finger lever secured to the outer end of said stub shaft and disposed exteriorly of said cap, and adjustable stop devices mounted on said cap to limit the swinging movement of the finger-lever in directions from left to right.

2. As a new product of manufacture, a dial enclosing cap adapted to be removably fitted on a bearing block, said cap having a central bearing hole, a stub shaft mounted for rotation in said bearing hole, said stub shaft being screw threaded and provided with a lock nut on one end, said screw-threaded end being adapted to be operatively connected to said dial, a finger-lever secured to the opposite end of the stub shaft and located on the exterior of the cap, a pair of slotted members adjustably mounted on said cap, said members having lateral terminals providing stop elements with which an end portion of said lever is adapted to coact.

3. In a fluid meter of the class shown and described, meter means, a feed screw mounted for operation on said means, a cap accommodating and bearing block secured on said means, a dial mounted for rotation on said bearing block, an operating connection between the dial and said feed screw, a dial protector cap fitted over and enclosing said block and dial, a screw piercing said cap and securing the latter removably on said block, a stub shaft mounted for rotation in a bearing provided therefor in said cap, means connecting the stub shaft with said dial for turning the dial by way of the stub shaft, a finger lever mounted on the outer end of said stub shaft and disposed exteriorly of said cap, a set screw carried by said lever and detachably securing same to said stub shaft, a wire carried by said finger lever and normally rendering said set screw inaccessible, said wire having its end portions free, and a seal adjoining the end portions of the wire together in order to prevent unauthorized persons from tampering with said set screw.

4. In a fluid meter of the class described, meter means, a feed screw mounted for operation on said means, a cap accommodating and bearing block secured on said means, a dial mounted for rotation on said bearing block, an operating connection between the dial and feed screw, a cap fitted removably on said block, fastening means for said cap, said cap having a bearing opening, a stub shaft mounted in said opening, means connecting the stub shaft with said dial for imparting rotation to the dial, a finger lever secured to the outer end of said stub shaft and disposed exteriorly of said cap, a pair of stop devices having overlapping slotted portions, a headed screw having a shank passing through the slots, through the cap and detachably anchored on said bearing block, the head of said screw being provided with a passage, an apertured lug rigidly mounted on said cap, a sealing wire having a portion passing through the passage in said head and having one end portion passing through the aperture in said lug, the end portions of said wire at points beyond said lug being free, and a lead seal joining said wire-ends together in tamper-proof relationship.

5. As a new manufacture, a dial enclosing and protecting cap adapted to be removably mounted on a bearing block, said cap having a central bearing hole, a stub shaft having an end portion mounted for rotation in said bearing hole, one end of said stub shaft being screw-threaded and adapted to be operatively joined to a complemental dial, the outer end portion of the stub shaft extending through and beyond the bearing hole, a knob having a finger lever, said knob being mounted on said stub shaft, a set screw embedded in said knob and removably securing same on said stub shaft, tamper-proof seal means carried by said knob and serving to normally render said set screw substantially inaccessible without detection, a pair of substantially duplicate stop devices having overlapping slotted portions, said stop devices serving to limit the arc of swing of the lever in opposite clockwise and counterclockwise directions, a headed screw having a shank passing through the aligned slots and through said cap, the head of said screw having a wire opening, a lug on said cap, and a wire passing through said lug and opening in the head and provided with a lead seal.

CHARLES WEDEL.

REFERENCES CITED

The following references are of record in the file of this patent:

UNITED STATES PATENTS

| Number | Name | Date |
|---|---|---|
| 904,299 | Best | Nov. 17, 1908 |
| 1,137,129 | Gold | Apr. 27, 1915 |
| 1,519,061 | Schramm | Dec. 9, 1924 |
| 2,294,165 | Elms | Aug. 25, 1942 |
| 2,438,934 | Marsh | Apr. 6, 1948 |